April 7, 1970  D. WIGHT ET AL  3,504,705
REVOLVING CONNECTOR
Filed Oct. 9, 1967  2 Sheets-Sheet 1
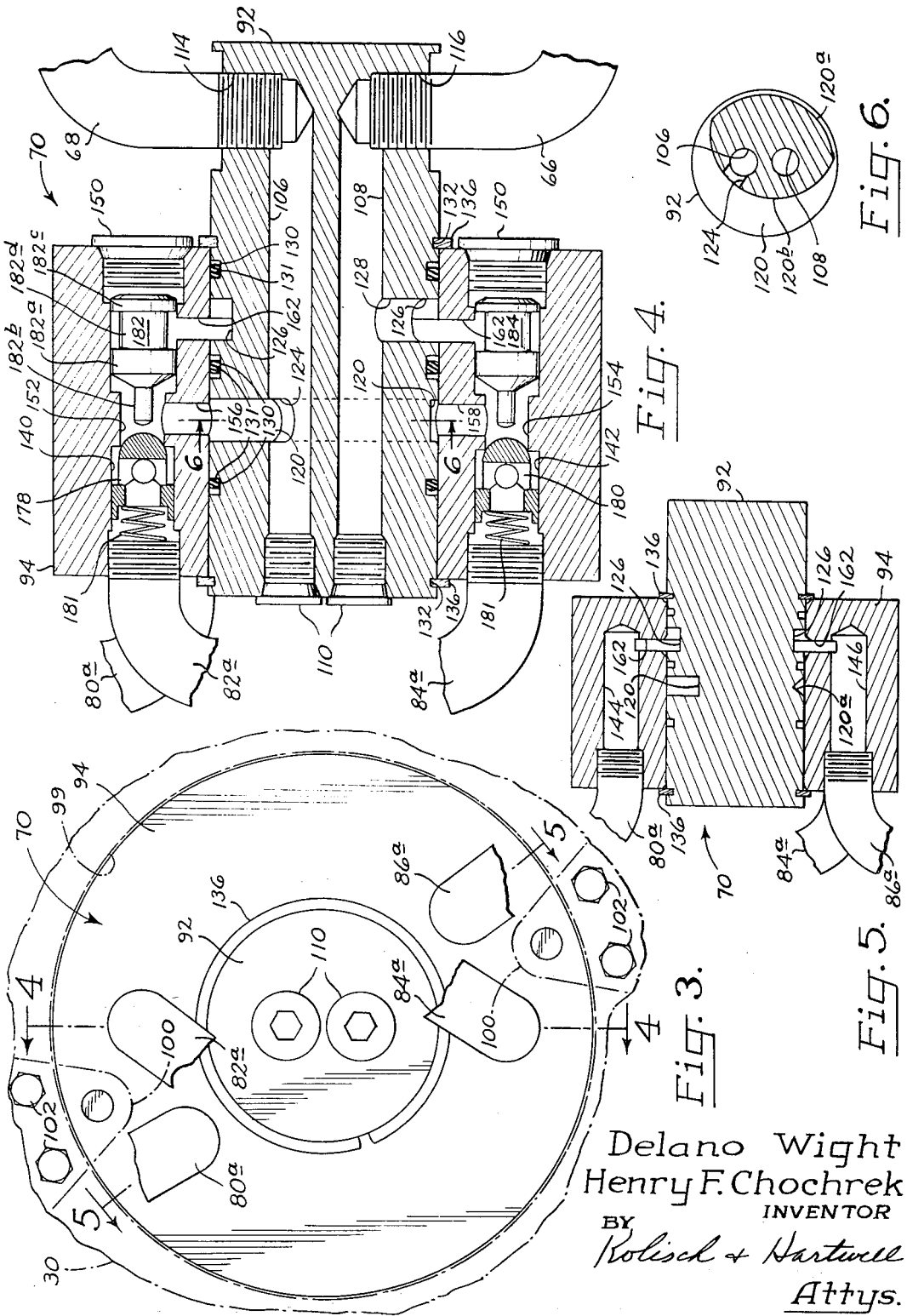
Delano Wight
Henry F. Chochrek
INVENTOR
BY
Kolisch & Hartwell
Attys.

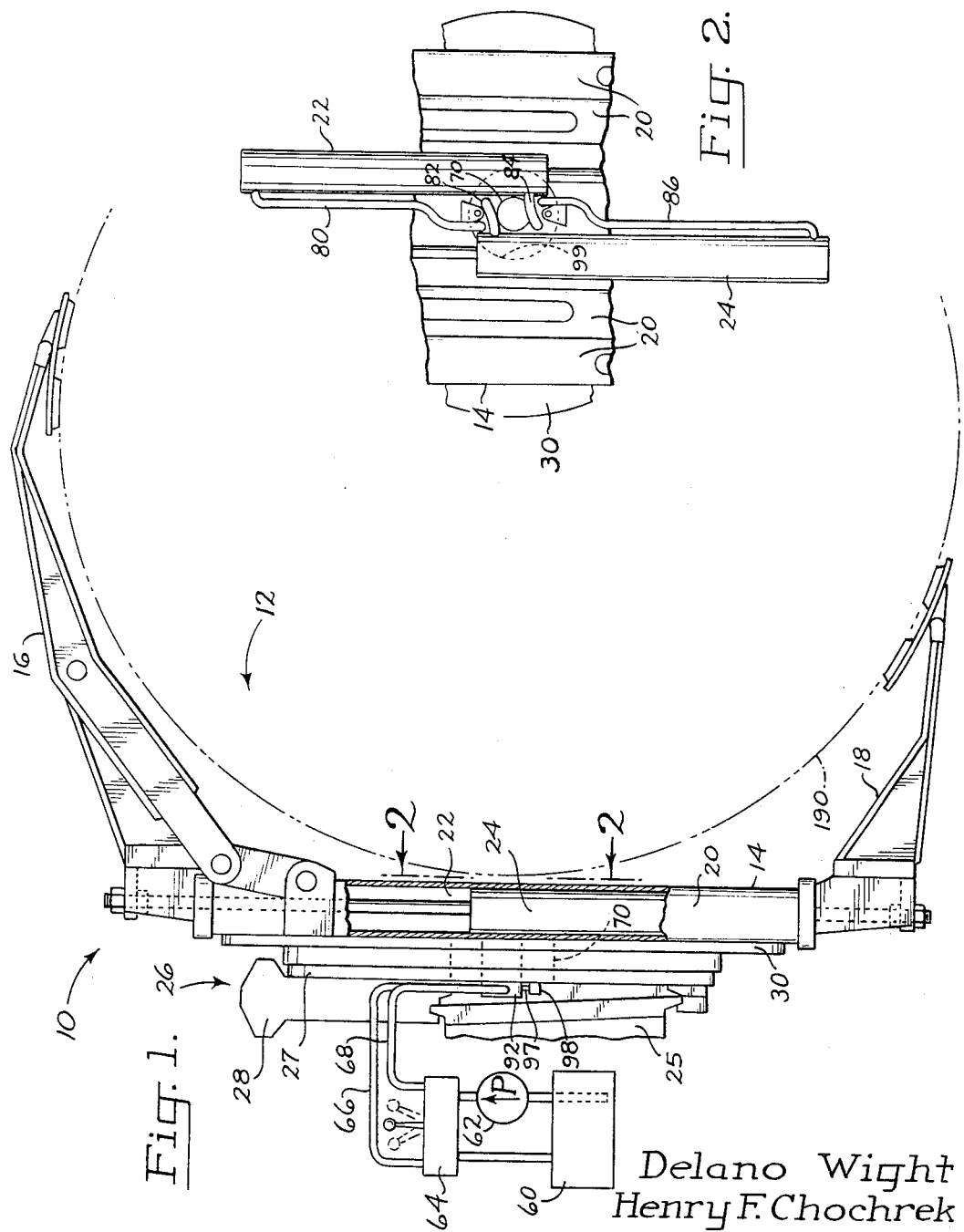

United States Patent Office 3,504,705
Patented Apr. 7, 1970

3,504,705
REVOLVING CONNECTOR
Delano Wight, Gresham, and Henry F. Chochrek, Portland, Oreg., assignors to Cascade Corporation, Portland, Oreg., a corporation of Oregon
Filed Oct. 9, 1967, Ser. No. 673,717
Int. Cl. F17d 1/00; E03b 1/00; E03c 1/00
U.S. Cl. 137—615        8 Claims

ABSTRACT OF THE DISCLOSURE

A revolving connector interposed between two relatively rotatable devices, with the connector including a nonrotatable spool mounted on one of the devices and a rotatable member journaled on the spool and mounted for rotation with the other of the devices. A pair of fluid-flow courses extend through the spool and rotatable member accommodating fluid flow between the two devices. Check valve means mounted in one of the fluid-flow courses normally permits fluid flow through that course in one direction only. The other fluid-flow course in the pair includes a pressure-responsive element which is operable, on the introduction of pressure fluid to said other course, to open the check valve permitting a reverse flow of fluid therethrough.

---

This invention relates to a revolving connector which accommodates a flow of fluid between a pair of relatively rotatable devices. More particularly, it relates to a revolving connector which has a pair of fluid-flow courses extending therethrough, with a normally closed check valve in one of the courses and a pressure-responsive element in the other course, the latter being operable to open the check valve under certain fluid pressure conditions.

In load-handling apparatus, it is common to provide a nonrotating device upon which a relatively rotatable device is mounted, with fluid-operated mechanism mounted on the rotatable device and a source of pressure fluid for operating the mechanism mounted on the nonrotating device. An example of such apparatus is a vehicle having a gripper attachment mounted thereon through a rotator, with the gripper attachment carrying a pair of load-clamping arms which are operated by a pair of fluid-operated rams. A revolving connector must be interposed between a fluid pressure source mounted on the vehicle, and the rams of the gripper attachment, for transmitting fluid therebetween.

The load-clamping arms of such an attachment are moved toward each other and against opposite sides of a load on operation of the rams in one direction. The weight of the load or other external forces at times function to urge the load-clamping arms apart with release of the load, and therefore it is desirable to provide locking means for preventing separation of the arms once they have clamped onto a load. Such locking means, however, must be releasable to permit the arms to be moved apart at the control of the vehicle operator. Pilot-operated check valves mounted exteriorly of the revolving connector have been used in the past for such locking purposes, however, such valves have been exposed and susceptible to damage by loads handled by the attachment, and have further required extensive exposed connecting lines and fittings, which are disadvantageous.

A general object of the invention is to provide a revolving connector accommodating the flow of fluid between two relatively rotatable devices, where the connector is simple and compact in construction and includes a check valve integral therewith.

Another object of the invention is to provide such a revolving connector, which has two fluid-flow courses extending therethrough with a check valve mounted in one of the courses normally permitting fluid flow in one direction only, and which also includes a pressure-responsive element which senses the pressure of fluid in the other course and is operable on fluid under pressure being supplied to the other course to open the check valve permitting a reverse flow of fluid through the one course.

Yet another object is to provide such a revolving connector, wherein both the check valve and the pressure-responsive element are mounted within the revolving connector, thus conserving space in the apparatus and protecting the check valve and pressure-responsive element from exposure to damage by loads handled by the apparatus.

A related object is the provision of a novel revolving connector including a pilot-operated check valve, which eliminates the need for multiple, exposed fluid connecting lines.

Still another object of the invention is to provide a novel revolving connector of the above description, which includes a check valve for the reasons indicated where such is located downstream from seals in the connector, whereby should leakage occur in such seals, cavitation in any mechanism supplied fluid through the connector is inhibited.

These and other objects and advantages will become more fully apparent as the following description is read in conjunction with the drawings, wherein:

FIG. 1 is a side elevation view of load-handling apparatus in which a revolving connector is used to provide fluid communication between a source of pressure fluid and a relatively rotatable load-handling attachment;

FIG. 2 is a view taken generally along the line 2—2 in FIG. 1, illustrating a front view of the revolving connector as mounted in the load-handling apparatus;

FIG. 3 is an enlarged view of the front end of the revolving connector;

FIG. 4 is a cross-sectional view of the revolving connector, taken generally along the line 4—4 in FIG. 3;

FIG. 5 is a cross-sectional view of the revolving connector, taken generally along the line 5—5 in FIG. 3, drawn on a reduced scale; and FIG. 6 is a cross-sectional view, taken generally along the line 6—6 in FIG. 4, drawn to a reduced scale, illustrating the configuration of a crescent-shaped groove about a spool member in the connector.

Referring now to the drawings, and more particularly to FIGS. 1 and 2, at 10 is indicated generally load-handling apparatus such as would be suitable for use in handling paper rolls. The apparatus comprises a gripper attachment indicated generally at 12, which includes a frame 14, and a pair of opposed relatively movable load-clamping arms 16, 18 mounted for movement on the frame. The frame includes guide tubes, such as the one shown at 20, slidably mounting guide rods (not shown) connected to the arms, whereby the arms are guided for movement toward and away from each other. The arms are moved under power by actuating the rams 22, 24 shown in FIG. 2 which are mounted on the frame inwardly of the guide tubes. The rams have their cylinder ends mounted in stationary positions on the frame. The rod end of ram 24 extends upwardly to a connection with arm 16 and the rod end of ram 22 extends downwardly to a connection with arm 18.

The gripper attachment is connected to an elevatable carriage as exemplified by the one partially shown at 25, found at the forward end of the usual lift truck (not shown) through a rotator 26. The rotator may be conventional and includes a nonrotatable member 27 and the usual power-operated means 28 mounted on this member for rotating a plate 30 at the front of the rotator about a substantially horizontal axis extending longitudinally of the lift truck. By including the rotator the frame 14 and arms may be rotated about such axis, whereby loads such as paper rolls gripped by the arms may be turned over, placed on end, etc. As illustrated schematically in FIG. 1, the hydraulic fluid, or pressure fluid, for actuating rams 22, 24 is provided from a source on the truck including reservoir 60 and pump 62. A control valve 64, also ordinarily mounted on the truck, is adjustable from a neutral position wherein lines, or conduits 66, 68 emanating from the valve are blocked off to one of two actuating positions. In one actuating position fluid under pressure is admitted to conduit 66 and permitted to exhaust from conduit 68, and in the other actuating position fluid under pressure is admitted to conduit 68 and exhausted from conduit 66. Conduits 66, 68 connect the valve with a revolving connector, generally shown at 70, interposed between nonrotatable member 27 and rotatable plate 30, and provided to establish fluid communication between conduits 66, 68 and conduits 80, 82, 84 and 86 (see FIG. 2) which connect with opposite ends of the cylinders of rams 22, 24 and provide for the supply and exhaust of fluid to these rams.

Referring now to FIGS. 3 and 4, revolving connector 70 comprises an elongated, cylindrical spool member 92, also referred to as a first or nonrotating member, and a relatively rotatable, or second, member 94 which is journaled on the spool member. As is best seen in FIG. 1, a portion of spool member 92 projects to the rear of stationary member 27 of the rotator. A keeper bar 98 with a pin 97 projecting upwardly therefrom is secured to the back of stationary member 27, beneath the rear end of the spool member, and this pin is inserted into an accommodating hole (not shown) in the bottom of the spool member. The spool member is thus held in a nonrotating position.

As is best illustrated in FIG. 2, and in the enlarged details of FIG. 3, rotatable member 94 is inserted in a formed opening 99 in face plate 30 (to which frame 14 is attached). A pair of ears 100 secured to the face plate are also secured to the rotatable member, whereby the member and frame rotate as one. The ears may be secured to the frame as by bolts 102.

Considering more in detail the construction of connector 70, spool member 92, as illustrated in FIG. 4, has a pair of parallel bores 106, 108 extending longitudinally through a major portion thereof, and a pair of plugs 110 close off one set of ends and these bores. An opposed pair of bores 114, 116 extend at right angles to bores 106, 108 through portions of the spool member remote from these plugs.

As is seen in FIGS. 4, 5, and 6, a first annular passage 120 is formed about the spool member between its ends. The configuration of this first annular passage is best illustrated in FIG. 6, wherein it is seen that crescent-shaped groove 120b provides a major portion of the passage, and the passage is completed by a relatively small groove 120a of triangular cross section (see FIG. 5). Bore 124 extending through the side of the spool member connects bore 106 with passage 120, as is seen in FIGS. 4 and 6.

A second annular passage, or groove, 126, of substantially uniform cross section, extends about the spool member in a region spaced axially from passage 120. Bore 128, illustrated in FIG. 4, extends through the side of the spool member connecting groove 126 with bore 108.

A series of smaller annular grooves 130 are provided about the spool member, between and on both sides of passages 120, 126. These grooves receive seals 131 and provide a fluid-tight seal between spool member 92 and rotatable member 94. Annular grooves 132 adjacent opposite ends of the spool member receive retaining rings 136 which project outwardly from the spool and abut opposite ends of rotatable member 94, thus to inhibit relative axial movement of the spool member.

Rotatable member 94 is substantially cylindrical in shape and has four primary bores extending longitudinally therethrough, two of which are illustrated at 140, 142 in FIG. 4 and the other two of which are illustrated in FIG. 5 at 144, 146. As is seen in FIG. 4, bores 140, 142, extend completely through rotatable member 94 and are closed off by plugs 150 at the right end of the connector as seen in FIG. 4. Each of bores 140, 142 has a restricted throat section, shown for the bores at 152, 154, respectively. Bore 156 extending transversely through a portion of the rotatable member interconnects bore 140 and passage 120, and similar bore 158 interconnects bore 142 and passage 120.

An annular channel 162 extends about the interior of rotatable member 94, adjacent the right end of the rotatable member, as seen in FIGS. 4 and 5. This channel interconnects bores 144, 146 (see FIG. 5) and bores 140, 142, and connects these bores with passage 126.

Referring still to FIG. 4, slidably mounted within bores 140, 142, and to the left of their respective throat sections, are check valve means including closure devices 178, 180 adapted to seat on the throat sections. A spring 181 abuts the left end of each closure device, and urges it against its associated throat section to close off the bore containing the closure device. With fluid under sufficient pressure in a throat section, the closure device associated with the throat section backs off from the throat section to open the bore containing the throat section.

A pair of reciprocable pistons 182, 184, also referred to as pressure-responsive elements, are mounted within bores 140, 142, on the right in FIG. 4 of the restricted throat sections provided in these bores. The piston elements are similar, and as can be seen with reference to element 182, each has a main body portion 182a and a head portion 182c that fit relatively snugly within bore 140. Some leakage of fluid may take place around these portions, however, since no seals are provided sealing them to the bore. The piston further includes a plunger portion 182b of somewhat smaller diameter that projects into restricted throat section 152. Between the main body and head portions 182a, 182c is an annular groove 182d. With fluid under pressure in channel 162, and in the absense of fluid under pressure in throat section 152, the piston is urged to the left in FIG. 4 with some fluid leaking around the head portion to fill the space between the head and plug 150. Such movement ultimately causes plunger 182b to engage closure device 178 whereby the same is moved off of throat section 152. The piston is returned with pressure conditions reversed.

Referring now to FIGS. 2, 3 and 4, lines or conduits 80, 84 which connect with ram 22 join with fittings 80a, 84a to be connected through these fittings to bores 144 (see FIG. 5) and 142 (see FIG. 4). Conduits 82, 86 supplying and exhausting fluid from ram 24 are connected through fittings 82a, 86a to bores 140 (see FIG. 4) and bore 146 (see FIG. 5).

In the construction of the invention conduit 68, bore, or port, 114, bore 106, bore 124, passage 120, bores 156, 158, bores 140, 142, and conduits 82, 84 constitute what is referred to as a fluid course providing for the supply of pressure fluid to one set of ends of the rams when the rams are actuated to contract them so as to produce movement of the arms toward each other. Bore 140 and conduit 82, and bore 142 and conduit 84, constitute branches of this course. This same course provides for an exhaust of fluid from this set of ends of the rams during extension of the rams with movement of the arms away from each other. Conduit 66, port, or bore, 116, bore 108, bore 128, passage 126, channel 162, bores 144, 146, and conduits 80, 86 constitute another, or second, course for the supply of pressure fluid to the opposite set of ends of rams 22, 24 when extending the rams to produce movement of the arms away from each other. Bore 144 and conduit 80, and bore 146 and conduit 86, constitute branches of this course. This course provides for the exhaust of fluid from these rams on contraction of the rams.

Describing now the operation of the apparatus, and referring first to FIG. 1, the vehicle on which the gripper attachment is mounted is maneuvered to place the load-clamping arms on opposite sides of a load, such as a paper roll, indicated by the dot and dash outline at 190. Valve 64 may then be adjusted to supply pressure fluid from the pump to conduit 68, from which it is routed through the fluid flow course defined by bores 114, 106, annular passage 120 and bores 140, 142 to conduits 82, 84. On following this course through the revolving connector, the pressure fluid moves closure devices 178, 180 to positions opening bores 140, 142. Pressure fluid supplied to conduits 82, 84 flows to one set of ends of rams 22, 24 illustrated in FIG. 2 and acts to retract the rod ends of the rams to move arms 16, 18 together. As the rod ends are retracted, fluid exhausts from the opposite ends of the rams, through conduits 80, 86 and into the course defined by bores 144, 146, annular channel 162, and bores 108, 116 to conduit 66.

With the gripper mechanism shown in FIG. 1, where arm 18 is considerably shorter than arm 16 and has a more planar configuration along its outer extremity, it is convenient to pick up a roll on its side through the expedient of first extending the arms and then moving the short arm 18 up against the underside of such roll. When such an operation is performed, and when the arms are then brought together to clamp against the roll, it is desirable to have substantially all contracting movement take place in the long arm 16, since upward movement of arm 18 would only cause the roll to tend to roll off the arm. It is for this reason that passage 120 is shaped as best illustrated in FIG. 6. Further explaining, with the gripper mechanism positioned as in FIG. 1 where the short arm is directly under the longer arm 16, the relatively small groove 120a of passage 120 is positioned by the spool member opposite bore 158 in the rotatable member. This results in substantially closing off the flow off fluid from bore 106 to bore 158, so that pressure fluid supplied from conduit 68 is directed, for practical purposes, entirely to bore 156 and conduit 82. This results in movement of the long arm substantially exclusively of movement of the short arm.

Once the long arm has come down against the top of the roll so that both arms are contacting the roll, the movement of the long arm is restricted causing a build up of pressure in conduit 82. The short arm may then be caused to be moved toward the long arm to enable the production of full clamping pressure against the load, a desirable feature where the long arm cannot by itself produce such full clamping pressure, as in constructions of the type where the operating connection between the ram for the short arm and the short arm produces a greater mechanical advantage than the connection between the ram for the long arm and the long arm. When the short arm does move up against the load to produce full clamping pressure, the long arm in this type of construction is prevented from backing away under the force of the short arm since extension of ram 24 (such as would occur were the long arm to back away) can only occur with the exhaust of fluid from conduit 82 which is prevented by closure device 178.

Once both arms have been brought into contact with the load and are exerting sufficient pressure against opposing sides of the load to hold it, the valve on the vehicle may be moved to a neutral position wherein no fluid is supplied to conduits 66 or 68. With the control valve in a neutral position, closure devices 178, 180 within the revolving connector are biased into closed positions preventing an exhaust of pressure fluid from the rams through conduits 82, 84, hydraulically locking the arms against being moved away from each other by the weight of the load or other external forces.

To release the load from the grip of the load-clamping arms, valve 64 is adjusted to supply pressure fluid through conduit 66, from which conduit it is routed through the course defined by bores 116, 108, annular channel 162, and bores 144, 146, to conduits 80, 86. Conduits 80, 86 direct the pressure fluid to ends of the rams opposite the ends supplied by conduits 82, 84 to extend the rod ends of the rams. The rams do not extend immediately upon such a supply of fluid through conduits 80, 86, however, since closure devices 178, 180 are biased to their closed positions and pressure fluid cannot exhaust through conduits 82, 84. As the pressure of fluid in conduit 66 and bore 108 increases it acts against the right ends of pistons 182, 184 and shifts them to the left in FIG. 4. The pistons on being shifted sufficiently to the left, contact closure devices 178, 180 and move them to their open positions, allowing fluid to exhaust from the rams through conduit 68, permitting arms 16, 18 to move apart.

It is particularly important to note that seals 131 provided in grooves 130 establishing a seal between the spool member and the relatively rotatable member are located in the revolving connector in positions that, considering the location of the source and the location of the ram supplied by the source, are upstream of the location of the check valve means. This is an important consideration, since, although leakage is not desired, sometimes it is prone to occur through the seals, but such leakage in the organization described, if it does occur, does not take place with any leakage from the lines or conduits which connect the check valve means with the rams 22, 24. As a consequence, such leakage will not result in any loss of clamping pressure. Further, should the load handled or other factors urge displacement of the arms in their mounting, the tendency for any leakage to occur which would accommodate this displacement is inhibited and the tendency for cavitation to occur in the lines on the gripper attachment as a result of such displacement is inhibited.

It should also be noted that the check valve means, including the closure devices as described, are located in the relatively rotatable outer member which encircles the inner spool member. This is significant in that it contributes to a compact construction enabling, as it does, the spool member to contain only the two passages which direct fluid from conduits 66, 68. The construction, of course, has the further advantage of all the operating components being shielded within the confines of the outer relatively rotatable member whereby the chance of damage to the various components is reduced to a minimum, and the organization having the further advantage of eliminating much of the external fittings and hose connections that have characterized some types of construction.

While an embodiment of the invention has been described herein, it is not intended to be specifically limited to the structure disclosed, as it is desired to cover all modifications and variations as would be apparent to one skilled in the art and that come within the scope of the appended claims.

It is claimed and desired to secure by Letters Patent:

1. In load-handling apparatus including a rotatable frame rotatably supported on a mounting and fluid-power-operated mechanism mounted on and rotatable with the frame, a revolving connector interposed between the frame and mounting for establishing fluid communication between a pressure fluid source and said fluid-power-operated mechanism, said connector comprising a nonrotating member mounted on the mounting, a relatively rotatable member mounted on the frame, means within said nonrotating and rotatable members defining a pair of courses for fluid flow from one to the other of said members, check valve means including a movable closure device mounted within one of said fluid flow courses having opened and closed positions and operable in its closed position to inhibit fluid flow in one direction through said one course, and a pressure-responsive element mounted within the other of said courses actuatable with fluid under pressure in such other course to urge said closure device to its open position.

2. The apparatus of claim 1, wherein the movable closure device is located on said relatively rotatable member, and in its closed position closes said one course in a portion thereof which is located in said relatively rotatable member.

3. The apparatus of claim 2, wherein said pressure responsive element is mounted on said relatively rotatable member, and on being actuated shifts against the closure device to move the device to its open position.

4. The apparatus of claim 1, wherein the nonrotating member comprises a spool member, and the rotatable member is journaled on the spool member.

5. The apparatus of claim 1, wherein the rotatable member is provided with a bore with a restricted throat section, the movable closure device opens and closes one side of said throat section, and the pressure-responsive element comprises a reciprocable piston mounted within said bore adjacent said closure device on the other side of said throat section operable on movement in one direction to shift the closure device to open said throat section.

6. The load handling apparatus of claim 1, wherein a pair of opposed load clamping arms are mounted on said rotatable frame, said fluid-power-operated mechanism comprises a fluid-operated ram for each arm for actuating the arms, one of said courses includes two branches connected to one set of ends of said rams providing for the supply and exhaust of pressure fluid to and from said one set of ends of said ram, and the other of said courses includes two branches connected to the other set of ends of said rams providing for the supply and exhaust of pressure fluid to and from the other set of ends of said rams.

7. A revolving connector accommodating transmitting pressure fluid between two adajacent and relatively rotatable devices comprising:

a first member adapted to be secured to one of such devices and a second member adapted to be secured to the other of such devices, said second member being positioned adjacent and being rotatable relative to said first member, a first port in said first member, a second port in said second member, and means within said first and second members defining a course through which fluid may flow between said first and second ports, check valve means including a movable closure device mounted in said course operable to permit a flow of fluid through said course from said first port to said second port while preventing a flow of fluid in a reverse direction, a third port in said first member, a fourth port in said second member, and means within said first and second members defining another fluid flow course through which fluid may flow between said third and fourth ports, and pressure-responsive valve actuating means in said other course operable in response to a pressure of fluids in said other course to move said closure device to an open position to accommodate fluid flow in said reverse direction through said first-mentioned course.

8. The connector of claim 7, wherein said first member comprises a spool and said second member is journaled on and is rotatable about said spool, a bore extends through said second member, a section of said bore constitutes a portion of said first-mentioned course, said movable closure device is mounted within said section of said bore, another section of said bore constitutes a portion of said other course, and said valve actuating means comprises a reciprocable piston mounted in said other section of said bore.

References Cited

UNITED STATES PATENTS

| 2,133,580 | 10/1938 | Searle | 137—625.22 |
| 3,333,598 | 7/1967 | Schott | 285—190 |

WILLIAM F. O'DEA, Primary Examiner

W. H. WRIGHT, Assistant Examiner

U.S. Cl. X.R.

137—625.15, 625.18, 625.21